(12) United States Patent
Chen et al.

(10) Patent No.: US 12,237,470 B2
(45) Date of Patent: Feb. 25, 2025

(54) PHOSPHATE-BASED FLAME-RETARDANT ELECTROLYTE AND LITHIUM-METAL BATTERY

(71) Applicant: Nankai University, Tianjin (CN)

(72) Inventors: Jun Chen, Tianjin (CN); Chunyu Zheng, Tianjin (CN); Yuankun Wang, Tianjin (CN); Yunpeng Hou, Tianjin (CN); Zhenhua Yan, Tianjin (CN); Haixia Li, Tianjin (CN); Qing Zhao, Tianjin (CN)

(73) Assignee: Nankai University, Tianjin (CN)

( * ) Notice: Subject to any disclaimer, the term of this patent is extended or adjusted under 35 U.S.C. 154(b) by 0 days.

(21) Appl. No.: 18/355,460

(22) Filed: Jul. 20, 2023

(65) Prior Publication Data

US 2024/0322248 A1    Sep. 26, 2024

(30) Foreign Application Priority Data

Mar. 21, 2023    (CN) .......................... 202310272422.3

(51) Int. Cl.
*H01M 10/0568*    (2010.01)
*H01M 4/38*    (2006.01)
(Continued)

(52) U.S. Cl.
CPC ....... *H01M 10/0568* (2013.01); *H01M 4/382* (2013.01); *H01M 10/0525* (2013.01);
(Continued)

(58) Field of Classification Search
CPC ......... H01M 10/0566; H01M 10/0567; H01M 10/0568; H01M 10/0569
See application file for complete search history.

(56) References Cited

U.S. PATENT DOCUMENTS

2016/0072152 A1    3/2016    Tsubouchi et al.
2020/0161706 A1    5/2020    Cao et al.

FOREIGN PATENT DOCUMENTS

CN    101071863 A    11/2007
CN    101079504 A    11/2007
(Continued)

OTHER PUBLICATIONS

Jin et.al; "A New Class of Phosphates as Co-Solvents for Nonflammable Lithium Ion Batteries Electrolytes". (Year: 2012).*
Scifinder phosphate solvent search (Year: 2012).*

*Primary Examiner* — Nathanael T Zemui

(57) ABSTRACT

The invention belongs to the technical field of batteries, and discloses a phosphate-based flame-retardant electrolyte and a lithium-metal battery, and the phosphate-based flame-retardant electrolyte consists of a lithium salt, a phosphate solvent and a diluent. According to the invention, dimethyl (2-methoxyethoxy)methylphosphonate or diethyl (2-methoxyethoxy)methylphosphonate is used as a novel phosphate solvent, an electrolyte system with local high salt concentration is adopted, most phosphate solvent molecules are complexed with Li+ at the local high salt concentration by adjusting dosages of the lithium salt, the phosphate solvent and the diluent, so almost none of free solvent molecules exist, thus inhibiting irreversible decomposition of phosphate molecules on a surface of a li-anode, and meanwhile, the flame retardancy of the phosphate solvent greatly improves the safety of the lithium-metal battery.

6 Claims, 9 Drawing Sheets

(51) Int. Cl.
*H01M 10/0525* (2010.01)
*H01M 10/0567* (2010.01)
*H01M 10/0569* (2010.01)
*H01M 4/02* (2006.01)

(52) U.S. Cl.
CPC ... *H01M 10/0567* (2013.01); *H01M 10/0569* (2013.01); *H01M 2004/027* (2013.01); *H01M 2300/0028* (2013.01)

(56) References Cited

FOREIGN PATENT DOCUMENTS

| | | | |
|---|---|---|---|
| CN | 101079505 | A | 11/2007 |
| CN | 107634266 | A | 1/2018 |
| CN | 109449490 | A | 3/2019 |
| CN | 109599592 | A | 4/2019 |
| CN | 109818059 | A | 5/2019 |
| CN | 109860705 | A | 6/2019 |
| CN | 112290086 | A | 1/2021 |
| CN | 113113670 | A | 7/2021 |
| CN | 114171794 | A | 3/2022 |
| CN | 114464885 | A | 5/2022 |
| CN | 114976256 | A | 8/2022 |
| JP | H08321313 | A | 12/1996 |
| JP | 2014116078 | A | 6/2014 |

\* cited by examiner (Arbuzov reaction)

PHOSPHATE-BASED FLAME-RETARDANT ELECTROLYTE AND LITHIUM-METAL BATTERY

CROSS REFERENCE TO RELATED APPLICATIONS

This application claims foreign priority of Chinese Patent Application No. 202310272422.3, filed on Mar. 21, 2023 in the China National Intellectual Property Administration, the disclosures of all of which are hereby incorporated by reference.

TECHNICAL FIELD

The present invention belongs to the technical field of batteries, and particularly relates to a phosphate-based flame-retardant electrolyte and a lithium-metal battery.

BACKGROUND OF THE PRESENT INVENTION

Lithium-ion batteries have developed rapidly in the past decades, but an energy density of the lithium ion batteries is approaching a theoretical limit. Lithium metal has an ultra-high theoretical specific capacity (3862 mAh $g^{-1}$), so that lithium-metal batteries have attracted extensive attentions. In recent years, a proportion of electric vehicles in the vehicle market is increasing due to advantages of energy saving and no pollution, but safety accidents of the electric vehicles also occur occasionally. Especially, when the temperature rises in summer, vehicle fire accidents also increase. One main reason for the fire of the electric vehicles is use of organic combustible solvents, such as ethylene carbonate, propylene carbonate, dimethyl carbonate, diethyl carbonate and methyl ethyl carbonate, wherein some organic carbonates have low boiling point and flashing point, and generate hydrogen radicals during heating, thus increasing a possibility of combustion. Meanwhile, as for lithium metal batteries, a traditional carbonate-based electrolyte ha high reactivity, produces a side reaction with a lithium metal anode, and generates an uncontrollable lithium dendrite, resulting in low coulombic efficiency and a potential safety hazard. Therefore, it is urgent to develop an electrolyte system with a high safety and a friendly interface.

Phosphate solvent is a common flame-retardant solvent, the existence of phosphorus makes the phosphate solvent non-flammable, and the phosphorus can also play a flame-retardant role through free radical capture mechanism. Free radical capture mechanism of phosphate is that: when the temperature rises, the phosphate is gasified by heating to release phosphorus-containing free radicals, and the phosphorus-containing free radicals capture hydrogen free radicals and hydroxyl free radicals in the system, thus preventing combustion. However, the phosphate solvent faces the problem of poor compatibility with the lithium metal, which seriously affects a cycle life and a cycle stability of the lithium metal batteries, thus hindering applications of the phosphate solvent in the lithium metal batteries.

At present, common methods for improving compatibility between the phosphate and the li-anode comprise: ① using a film-forming additive; and ② adopting an electrolyte system with a high concentration or a local high concentration. A large amount of film-forming additive may degrade a battery performance, so that a micro amount of film-forming additive is generally used, which may cause the problems of short effective time and difficulty of dosage control. When the electrolyte system with the local high concentration is used, most phosphate solvent molecules are complexed with Lit, and almost none of free solvent molecules exist. Therefore, the purpose of inhibiting irreversible decomposition of phosphate molecules on thea surface of the lithium metal to realize reversible electrochemical cycle of the lithium metal batterieLMBs is achieved. Meanwhile, a safety performance of the electrolyte is further improved by using with a non-flammable diluent.

The phosphates usually used in the above electrolyte system with the local high concentration comprise trimethyl phosphate and triethyl phosphate, both of which have the problems of poor compatibility with the lithium metal and easy formation of a lithium dendrite. The lithium salts comprise lithium bis(trifluoromethanesulphonyl)imide and lithium hexafluorophosphate. However, the lithium bis(trifluoromethanesulphonyl)imide has a large relative molecular mass, which easily causes the problems of higher viscosity and lower conductivity compared with lithium salts with a small relative molecular mass at the same concentration. The lithium hexafluorophosphate has a small relative molecular mass, but has poor thermal stability, thus being not suitable for the flame-retardant electrolyte. The diluents usually used comprise bis(2,2,2-trifluoroethyl) ether and 1H, 1H,5H-octafluoropentyl-1,1,2,2-tetrafluoroethyl ether, both of which have the problem of high price.

SUMMARY OF PRESENT INVENTION

The present invention aims to solve the problem of incompatibility between a phosphate-based electrolyte and lithium metal, and to develop a phosphate-based non-flammable electrolyte applied in a lithium-metal battery. The electrolyte system takes dimethyl (2-methoxyethoxy)methylphosphonate or diethyl (2-methoxyethoxy)methylphosphonate as a main solvent, which has a molecular structure characterized by a long ether chain as a side chain, and meanwhile, local high concentration is combined, which inhibits growth of a lithium dendrite, thus significantly improving coulombic efficiency of the lithium-metal battery and prolonging a cycle life.

A technical solution of the present invention is as follows:

In a first aspect of the present invention, a phosphate-based flame-retardant electrolyte is provided, and the electrolyte consists of a lithium salt, a phosphate solvent and a diluent; and the lithium salt is a fluorine-containing lithium salt, the phosphate solvent is dimethyl (2-methoxyethoxy) methylphosphonate or diethyl (2-methoxyethoxy)methylphosphonate, and diethyl (2-methoxyethoxy)methylphosphonate is optimum.

The phosphate solvent accounts for 10% to 90% of an overall electrolyte volume; and the a volume ratio of the phosphate solvent to the diluent is 1 to 6:4 to 9, such as 1.67:8.33, 2:8, 6:4 and 4:6, and is preferably 1.67:8.33.

A local salt concentration is 1 mol/L to 6.6 mol/L, and an overall salt concentration is 0.7 mol/L to 3 mol/L.

A preparation method of the phosphate-based flame-retardant electrolytes comprises:
S1: mixing the phosphate and the diluent according to the volume ratio to obtain a mixed solvent; and
S2: adding the lithium salt into the mixed solvent obtained in S1, and stirring the mixture to dissolve the lithium salt to obtain the electrolyte.

Further, the lithium salt is one or more than two of lithium tetrafluoroborate, lithium bis(fluorosulfonyl)imide and lithium bis(trifluoromethanesulphonyl)imide.

The lithium bis(fluorosulfonyl)imide is optimum.

Further, the diluent is one or more than two of 1H,1H,5H-octafluoropentyl-1,1,2,2-tetrafluoroethyl ether, bis(2,2,2-trifluoroethyl) ether, methyl nonafluorobutyl ether and 1,1,2,2-tetrafluoroethyl-2,2,3,3-tetrafluoropropyl ether. The 1,1,2,2-tetrafluoroethyl-2,2,3,3-tetrafluoropropyl ether is optimum.

Further, the local salt concentration is 5 mol/L to 6.6 mol/L, and the overall salt concentration is 0.8 mol/L to 1.2 mol/L.

Further, a preparation method of the dimethyl or diethyl (2-methoxyethoxy)methylphosphonate (2-methoxyethoxy) methylphosphonate comprises: mixing trimethyl phosphite or triethyl phosphite with methoxyethoxy methyl chloride according to a molar ratio of 2 to 1:1 to react at 110° C. to 150° C. for 6 hours to 10 hours, carrying out reduced pressure distillation on the above solution, and taking an ingredient distilled at 133° C. to 145° C. as the dimethyl (2-methoxyethoxy)methylphosphonate or diethyl (2-methoxyethoxy)methylphosphonate.

In a second aspect of the present invention, a lithium-metal battery is provided, which applies the phosphate-based flame-retardant electrolyte.

According to the electrodes, an anode is Li-metal, and a cathode is are $LiNi_xCo_yMn_{1-x-y}O_2$, $LiFePO_4$, $LiCoO_2$, a lithiated organic cathode material or an organosulfur cathode material.

The lithium metal battery is a lithium-metal primary battery or a lithium-metal secondary battery.

Compared with the prior art, the present invention has advantages and beneficial effects as follows:

(1) The phosphate solvent used in the present invention has good compatibility with li-anode, is beneficial for lithium reversible deposition/dissolution, and inhibits a side reaction and growth of dendrite, thus effectively improving coulombic efficiency of the battery and improving a cycle stability and a cycle life.

(2) The lithium salt used in the present invention is the fluorine-containing lithium salt, which may form an anion-dominated solid electrolyte interphase layer with the local high concentration, which is rich in a LiF ingredient that can improve a stability of the solid electrolyte interphase, and effectively inhibits a side reaction, thus improving the coulombic efficiency and prolonging the cycle life of the lithium metal battery.

DETAILED DESCRIPTION OF PREFERRED EMBODIMENTS

A phosphate-based flame-retardant electrolyte, and a preparation method and application thereof are further described in detail hereinafter with reference to the drawings. It should be pointed out that, the following detailed descriptions are all exemplary, aim to provide further explanation for the present application, and do not constitute undue limitation of the present invention. Unless otherwise specified, all technical and scientific terms used herein have the same meaning as commonly understood by a person of ordinary skill in the art to which this application belongs.

Embodiment 1

(1) 0.1 mol triethyl phosphite and 0.1 mol methoxyethoxy methyl chloride were added into a round-bottomed flask, heated in an oil bath at 130° C. to react for 8 hours, and subjected to reduced pressure distillation twice, and an ingredient distilled at 135° C. to 140° C. was taken as diethyl (2-methoxyethoxy)methylphosphonate.

(2) The diethyl (2-methoxyethoxy)methylphosphonate and 1,1,2,2-tetrafluoroethyl-2,2,3,3-tetrafluoropropyl ether were mixed according to a volume ratio of 1.67:8.33.

(3) A certain mass of lithium bis(fluorosulfonyl)imide were added into the mixed solvent in the step (2), so thata local concentration reached 6 mol/L and an overall concentration reached 1 mol/L, and the mixture was subjected to magneton stirring for 8 hours at a stirring speed of 350 rpm/min to obtain a phosphate-based flame-retardant electrolyte.

Figure 1:
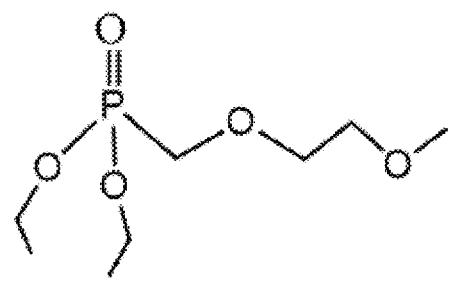
FIG. 1 shows a molecular structural formula of diethyl (2-methoxyethoxy)methylphosphonate prepared in Embodiment 1.

FIG. 1 shows a molecular structural formula of the diethyl (2-methoxyethoxy)methylphosphonate synthesized in the step (1).

Figure 2:
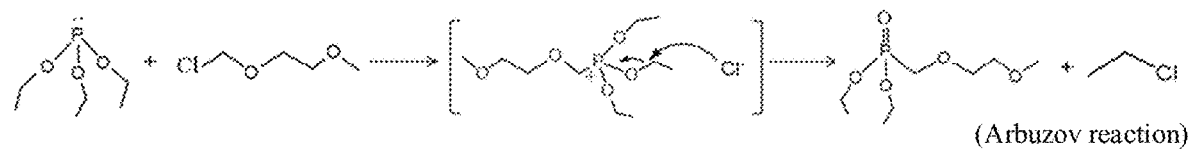
FIG. 2 shows a synthesis mechanism of the diethyl (2-methoxyethoxy)methylphosphonate prepared in Embodiment 1.

FIG. 2 shows a synthesis mechanism of the diethyl (2-methoxyethoxy)methylphosphonate synthesized in the step (1).

Figure 3:
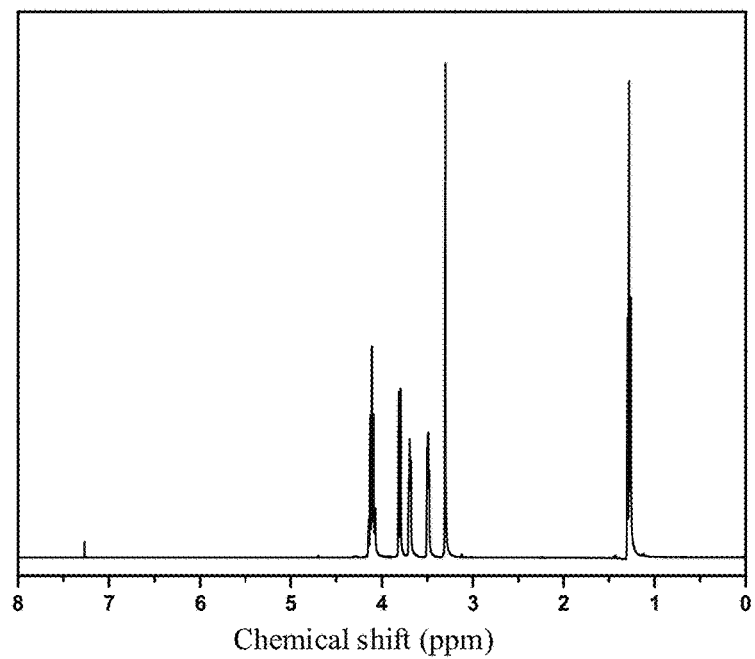
FIG. 3 shows a hydrogen nuclear magnetic resonance spectrum of the diethyl (2-methoxyethoxy)methylphosphonate prepared in Embodiment 1.

FIG. 3 shows a hydrogen nuclear magnetic resonance spectrum of the diethyl (2-methoxyethoxy)methylphosphonate synthesized in the step (1), under test conditions of 400 MHz and deuterated chloroform. The figure shows that the product has no impurity peak and has a high purity.

Figure 4:
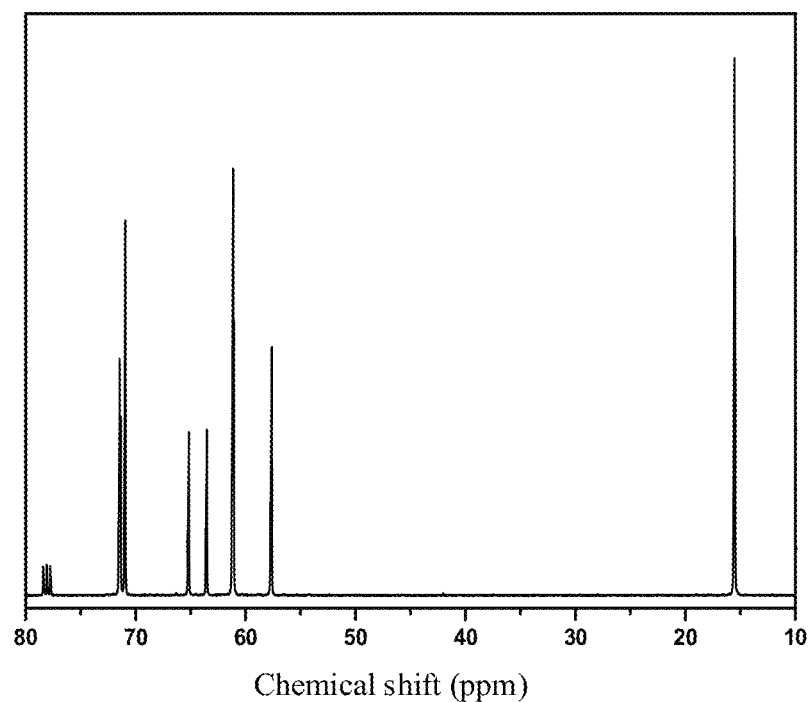
FIG. 4 shows a carbon nuclear magnetic resonance spectrum of the diethyl (2-methoxyethoxy)methylphosphonate prepared in Embodiment 1.

FIG. 4 shows a carbon nuclear magnetic resonance spectrum of the diethyl (2-methoxyethoxy)methylphosphonate synthesized in the step (1), under test conditions of 400 MHz and deuterated chloroform. The figure shows that the product has no impurity peak and has a high purity.

Figure 5:
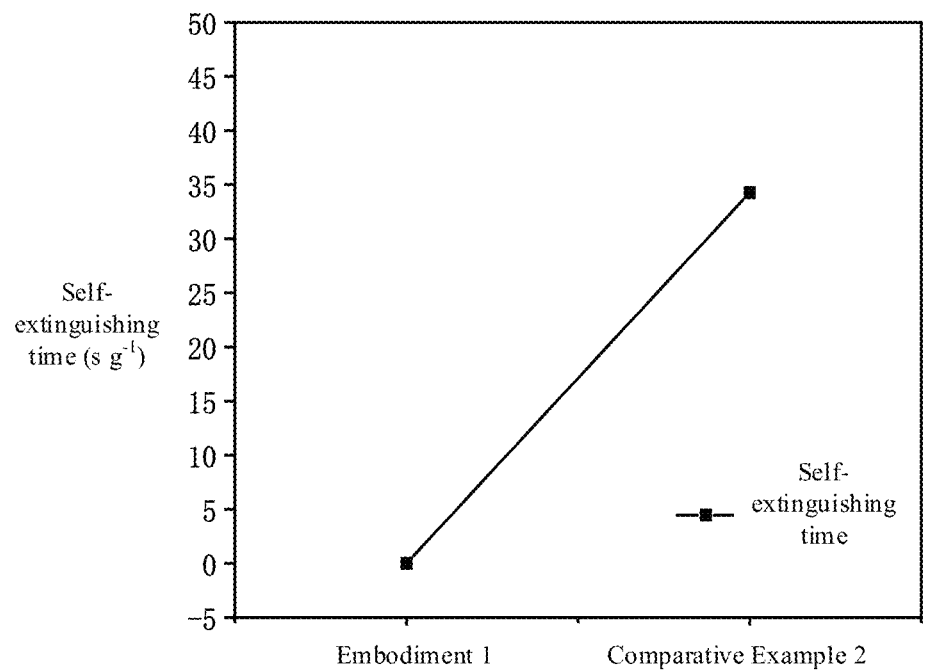
FIG. 5 is a self-extinguishing time chart of phosphate-based flame-retardant electrolytes in Embodiment 1 and Comparative Example 2.

FIG. 5 shows self-extinguishing time of the phosphate-based flame-retardant electrolyte prepared in Embodiment 1, which is 0 s/g, showing a high degree of incombustibility.

Figure 6:
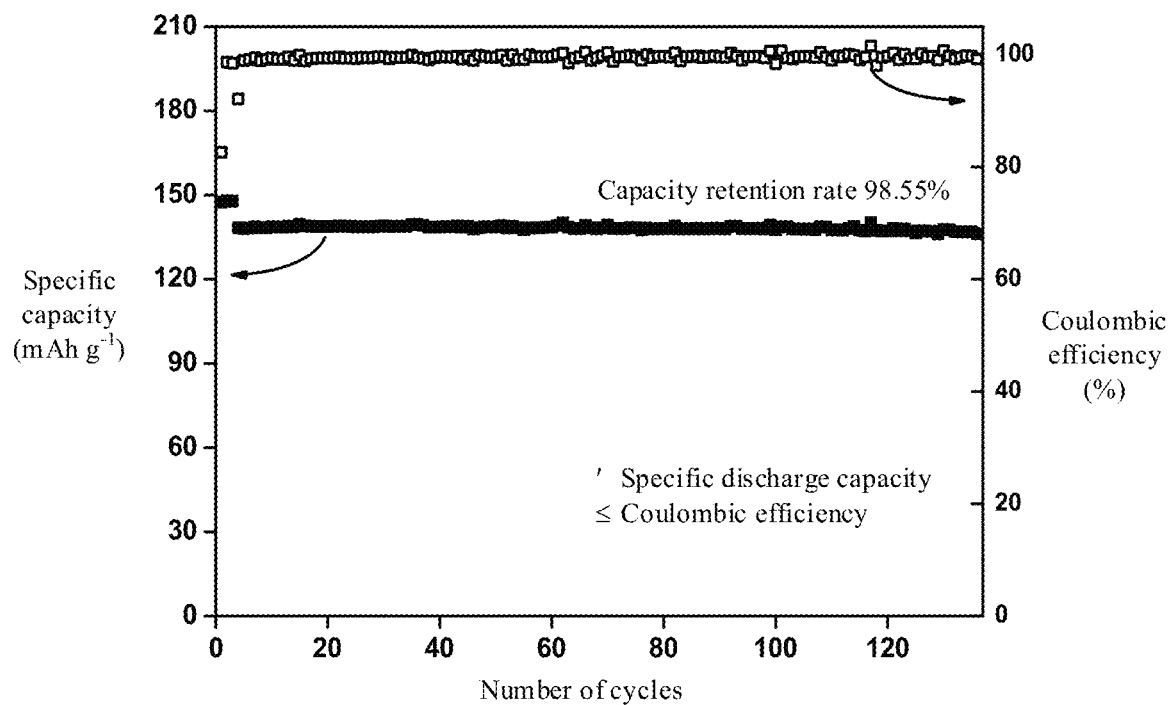
FIG. 6 is a cycle performance chart of a Li-NCM523 half cell with the phosphate-based flame-retardant electrolyte in Embodiment 1.

FIG. 6 is a cycle performance chart of a Li-NCM523 half cell assembled by applying the phosphate-based flame-retardant electrolyte prepared in Embodiment 1, with a voltage range of 2.7 V to 4.2 V. The figure shows that a tested specific capacity of the cell remains stable after 140 cycles at a rate of 0.5 C, with coulombic efficiency of cycle reaching 99.8% and a capacity retention rate of 98.6%.

Figure 7:
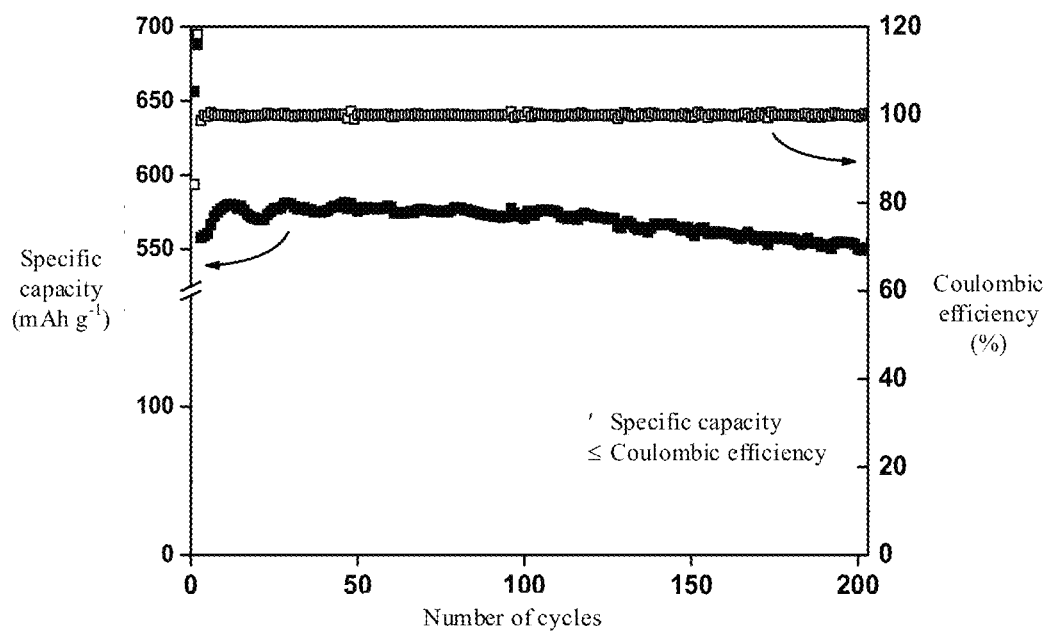
FIG. 7 is a cycle performance chart of a Li-SPAN (sulfide polyacrylonitrile) half cell with the phosphate-based flame-retardant electrolyte in Embodiment 1.

FIG. 7 is a cycle performance chart of a Li-SPAN (sulfide polyacrylonitrile) half cell assembled by applying the phosphate-based flame-retardant electrolyte prepared in Embodiment 1, with a voltage range of 1.0 V to 3.0 V. The figure shows specific capacity of the cell has no attenuation after 100 cycles at a rate of 0.5 C, with coulombic efficiency of reaching 99.8%; and the tested specific capacity of the cell remains stable after 200 cycles, with coulombic efficiency reaching 99.9%, and a capacity retention rate of 98.5%.

Figure 8:
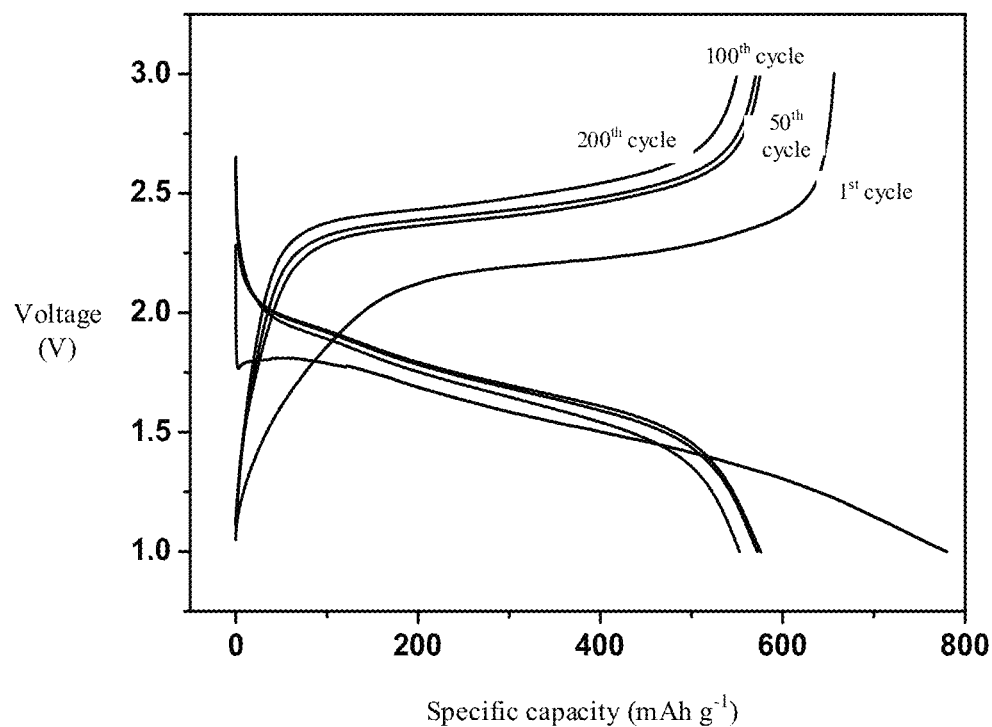
FIG. 8 shows charge-discharge curves of the Li-SPAN (sulfide polyacrylonitrile) half cell with the phosphate-based flame-retardant electrolyte in Embodiment 1.

FIG. 8 shows charge-discharge curves of different numbers of cycles of the Li-SPAN (sulfide polyacrylonitrile) half cell assembled by applying the phosphate-based flame-retardant electrolyte prepared in Embodiment 1.

Embodiment 2

This embodiment was different from Embodiment 1 in that: in step (2), diethyl (2-methoxyethoxy)methylphosphonate and 1,1,2,2-tetrafluoroethyl-2,2,3,3-tetrafluoropropyl ether were mixed according to a volume ratio of 2:8; and
in step (3), a certain mass of lithium bis(fluorosulfonyl) imide were added into the mixed solvent in the step (2), so that a local concentration reached 5 mol/L and an overall concentration reached 1 mol/L, and the mixture was subjected to magneton stirring for 5 hours at 350 rpm/min to obtain a phosphate-based flame-retardant electrolyte.

Figure 9:
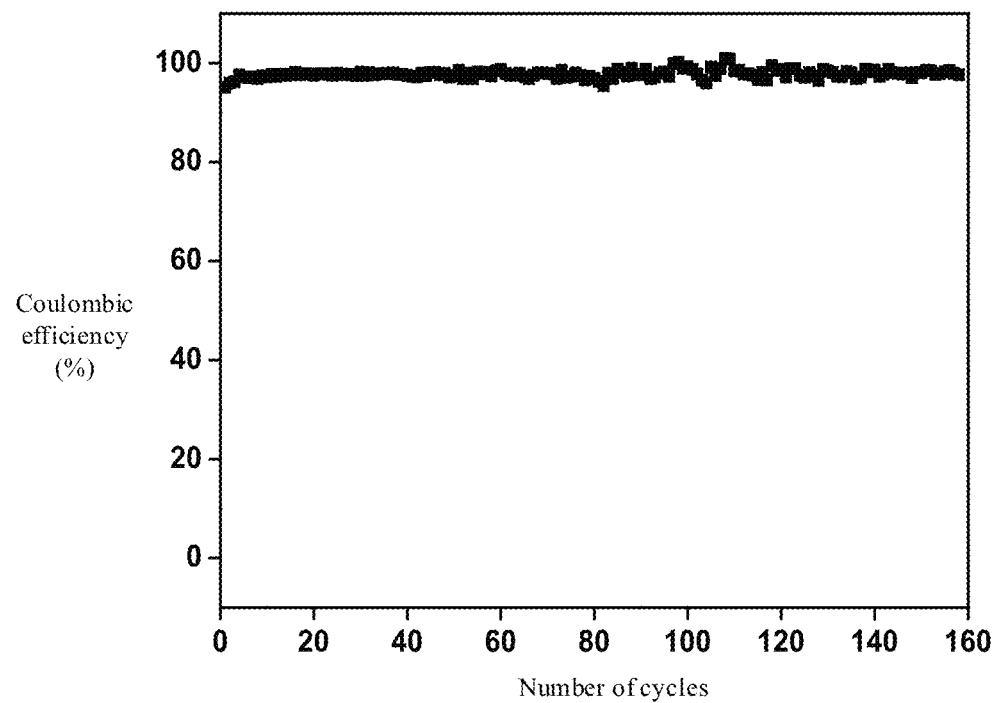
FIG. 9 is a cycle performance chart of a Li—Cu half cell with a phosphate-based flame-retardant electrolyte in Embodiment 2.

FIG. 9 is a number of cycles-coulombic efficiency chart of a Li—Cu half cell assembled by applying the phosphate-based flame-retardant electrolyte, with cycle conditions of 0.5 mA/cm$^2$ and 1 mAh/cm$^2$. The figure shows that tested average coulombic efficiency of the cell is maintained at 98% after 160 cycles.

Figure 10:
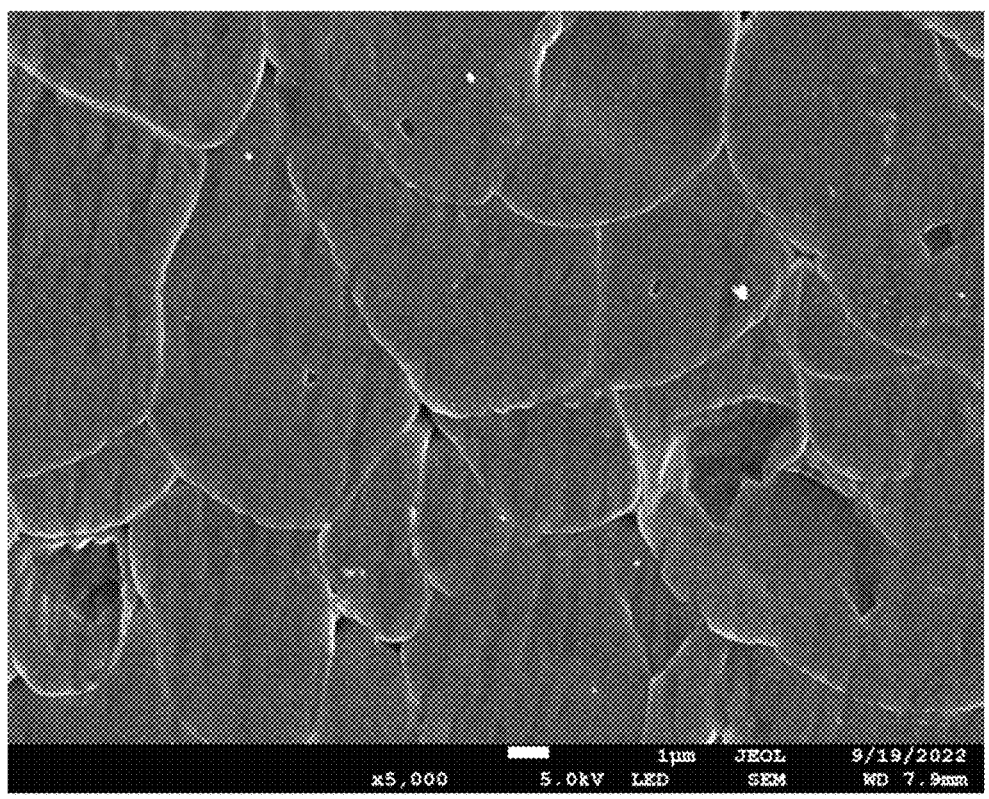
FIG. 10 is a SEM image of a lithium deposition morphology of the Li—Cu half cell with the phosphate-based flame-retardant electrolyte in Embodiment 2.

FIG. 10 is a scanning electron microscope image of a lithium deposition morphology in the Li—Cu half cell applying the phosphate-based flame-retardant electrolyte, with a magnification factor of 5000 times. The figure shows that the lithium deposition morphology of the Li—Cu half cell applying the phosphate-based flame retardant electrolyte is smooth and uniform, which corresponds to a long cycle life and high coulombic efficiency of the Li—Cu half cell in FIG. 9, proving that the present invention improves the compatibility between the phosphate and li-anode.

Figure 11:
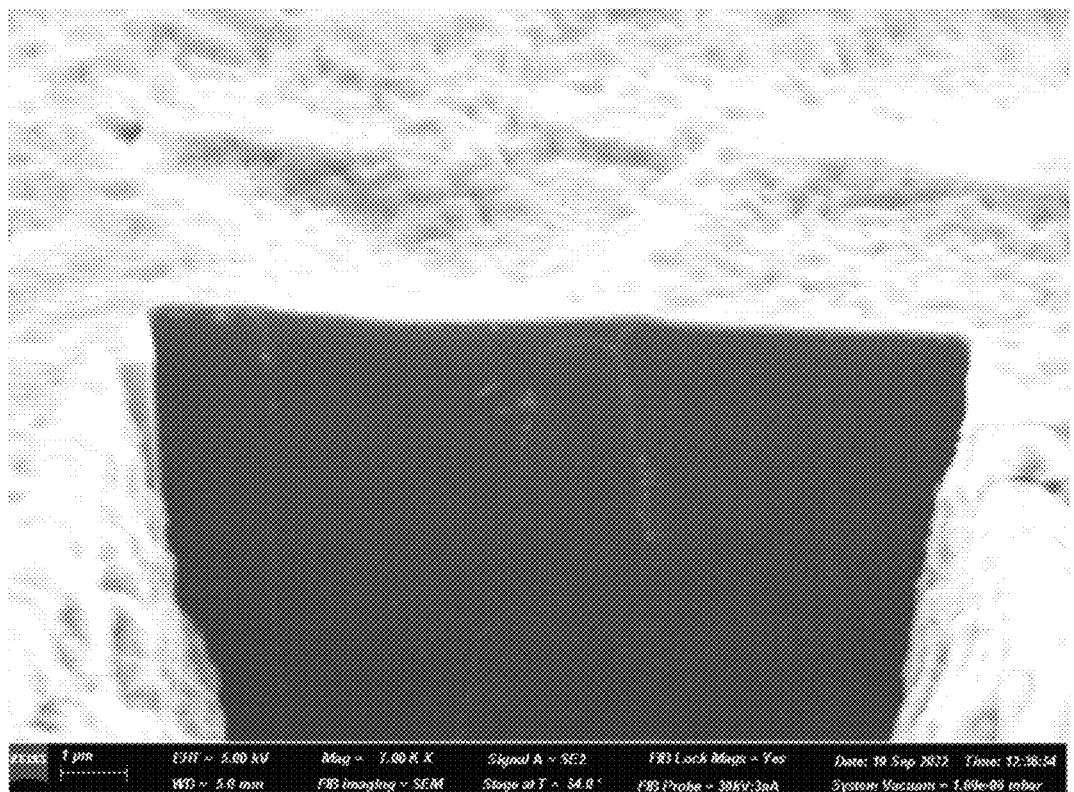
FIG. 11 is a FIB-SEM image of the lithium deposition morphology of the Li—Cu half cell with the phosphate-based flame-retardant electrolyte in Embodiment 2.

FIG. 11 is a focusing ion beam-scanning electron microscope image of the lithium deposition morphology of the Li—Cu half cell applying the phosphate-based flame-retardant electrolyte. The figure shows that the lithium deposition morphology is dense and non-porous, which greatly reduces a surface area of lithium deposition, thus effectively reducing a side reaction between the electrolyte and the lithium metal.

Embodiment 3

This embodiment was different from Embodiment 2 in that: in step (3), a certain mass of lithium bis(fluorosulfonyl) imide were added into the mixed solvent in the step (2), so that a local concentration reached 6.6 mol/L and an overall concentration reached 1.32 mol/L, and the mixture was subjected to magneton stirring for 6 hours at 200 rpm/min to obtain a phosphate-based flame-retardant electrolyte.

Figure 12:
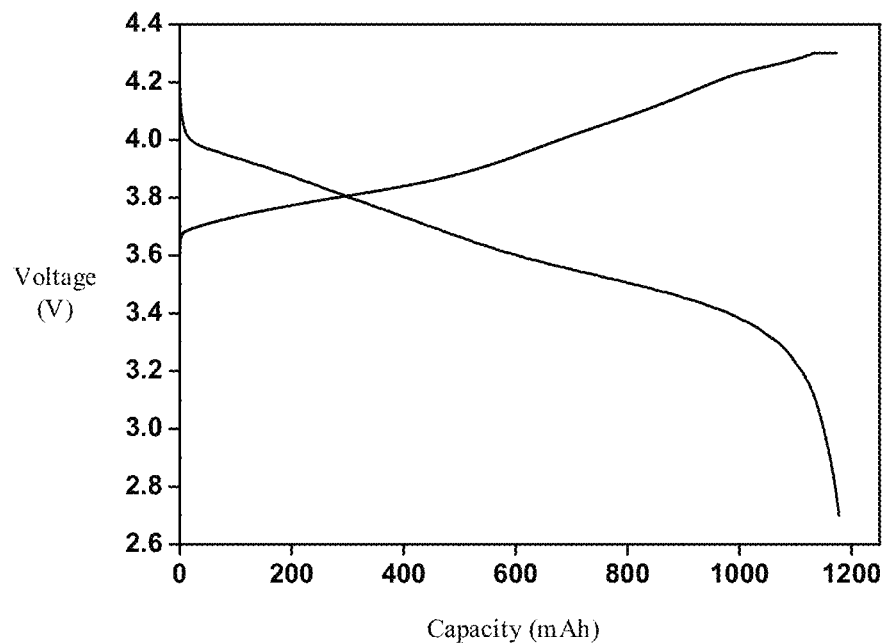
FIG. 12 shows charge-discharge curve of a first cycle of a NCM811-Li pouch cell with a phosphate-based flame-retardant electrolyte in Embodiment 3.

FIG. 12 shows charge-discharge curve of a first cycle of a NCM811-Li pouch cell applying the phosphate-based flame-retardant electrolyte, with a design capacity of 1.28 Ah, a N/P ratio of 1.48, a voltage range of 2.7 V to 4.3 V, and charging at 0.1 C and discharging at 0.3 C. The figure shows that a reversible capacity is 1.17 Ah, and coulombic efficiency is 100%.

Figure 13:
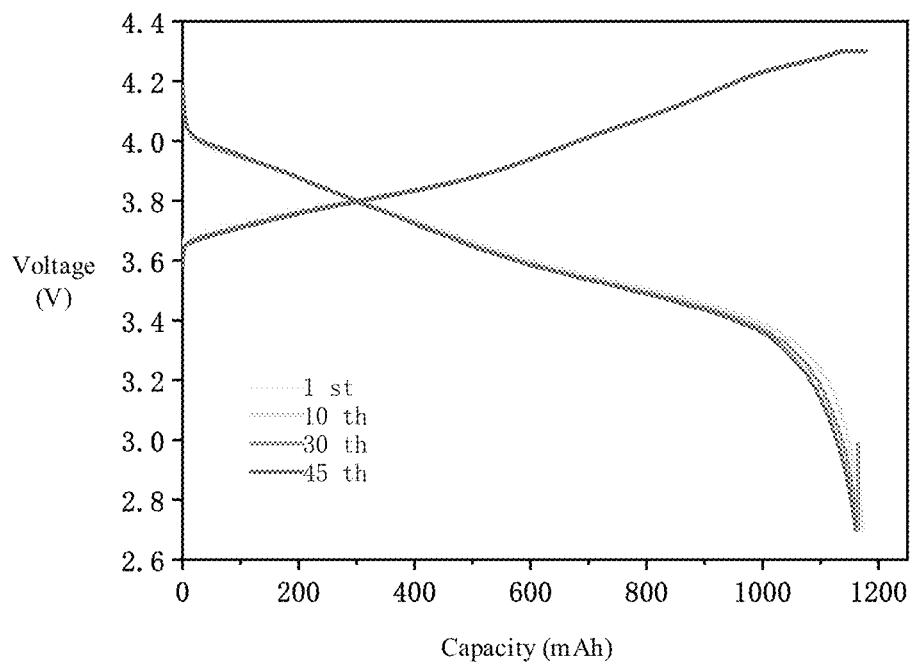
FIG. 13 shows charge-discharge curves of the NCM811-Li pouch cell with the phosphate-based flame-retardant electrolyte in Embodiment 3.

FIG. 13 shows charge-discharge curves of a 1st cycle, a 10th cycle, a 30th cycle and a 45th cycle of the NCM811-Li pouch cell, with a design capacity of 1.28 Ah, a voltage range of 2.7 V to 4.3 V, and charging at 0.1 C and discharging at 0.3 C. The figure shows that a charge-discharge capacity after 45 cycles has no obvious attenuation, and coulombic efficiency is greater than 99.5%.

Embodiment 4

This embodiment was different from Embodiment 1 in that: in step (2), diethyl (2-methoxyethoxy)methylphosphonate and 1,1,2,2-tetrafluoroethyl-2,2,3,3-tetrafluoropropyl ether were mixed according to a volume ratio of 6:4; and
in step (3), a certain mass of lithium bis(fluorosulfonyl) imide were added into the mixed solvent in the step (2), so that a local concentration reached 5 mol/L and an overall concentration reached 3 mol/L, and the mixture was subjected to magneton stirring for 6 hours at 300 rpm/min to obtain a phosphate-based flame-retardant electrolyte.

Figure 14:
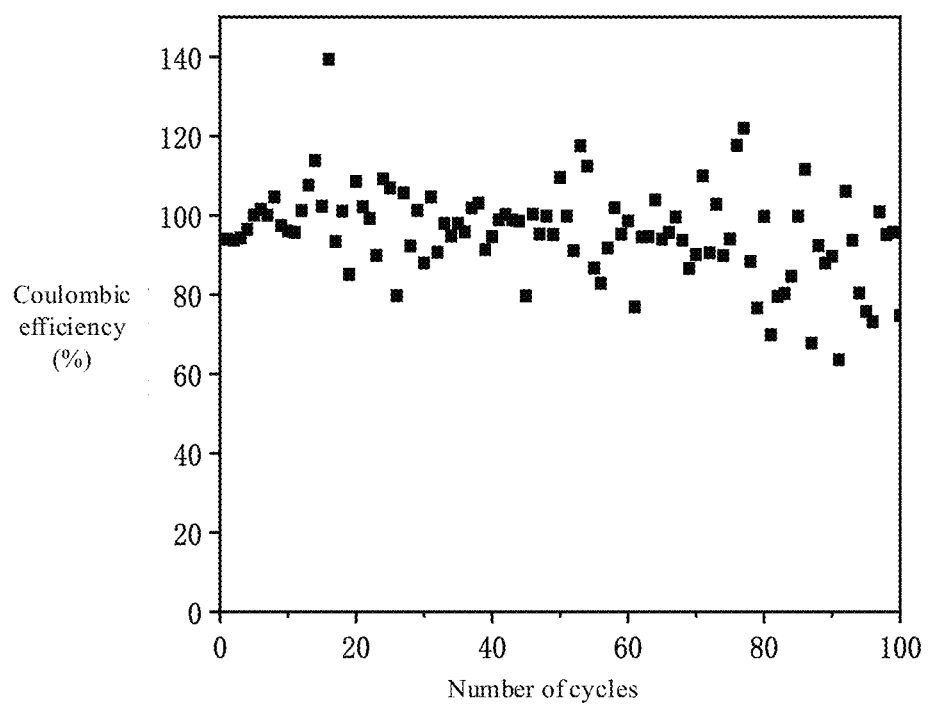
FIG. 14 is a cycle performance chart of a Li—Cu half cell with a phosphate-based flame-retardant electrolyte in Embodiment 4.

FIG. 14 is a number of cycles-coulombic efficiency chart of a Li—Cu half cell assembled by applying the phosphate-based flame-retardant electrolyte, with cycle conditions of 0.5 mA/cm$^2$ and 1 mAh/cm$^2$. The figure shows that the Li—Cu half cell may be cycled for 100 times.

Embodiment 5

This embodiment was different from Embodiment 1 in that: in step (2), diethyl (2-methoxyethoxy)methylphosphonate and bis(2,2,2-trifluoroethyl) ether were mixed according to a volume ratio of 3:7; and
in step (3), a certain mass of lithium bis(fluorosulfonyl) imide were added into the mixed solvent in the step (2), so that a local concentration reached 4.4 mol/L and an overall concentration reached 1.34 mol/L, and the mixture was subjected to magneton stirring for 4 hours at 280 rpm/min to obtain a phosphate-based flame-retardant electrolyte.

Figure 15:
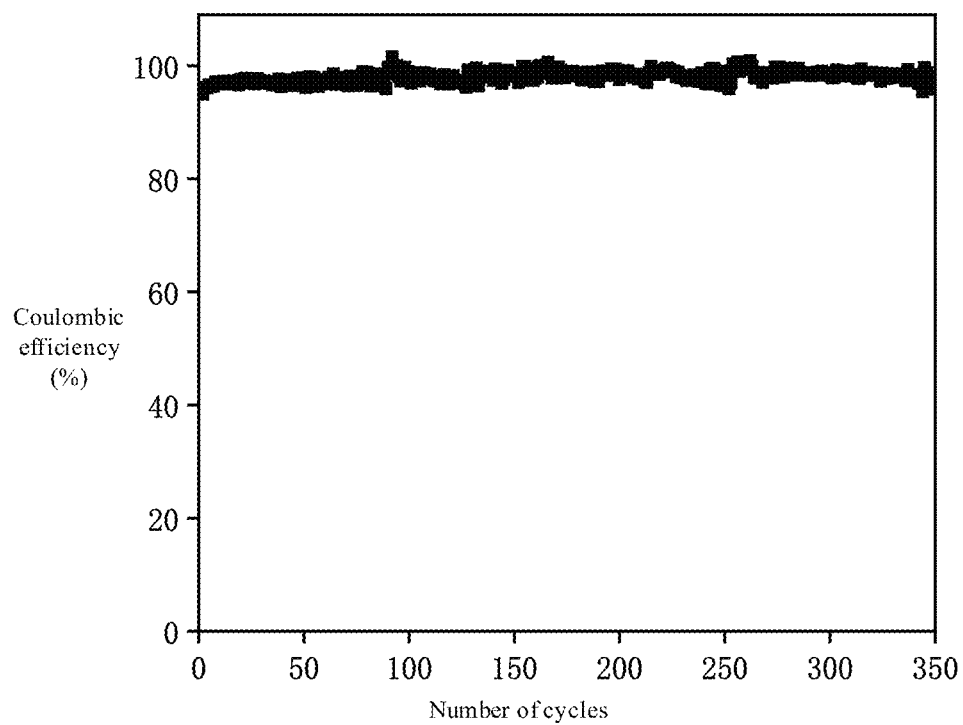
FIG. 15 is a cycle performance chart of a Li—Cu half cell with a phosphate-based flame-retardant electrolyte in Embodiment 5.

FIG. 15 is a number of cycles-coulombic efficiency chart of a Li—Cu half cell assembled by applying the phosphate-based flame-retardant electrolyte, with cycle conditions of 0.5 mA/cm$^2$ and 1 mAh/cm$^2$. The figure shows that tested average coulombic efficiency of the cell is maintained at 98% after 350 cycles.

Comparative Example 1

This embodiment was different from Embodiment 2 in that: in step (2), diethyl (2-methoxyethoxy)methylphosphonate was replaced by triethyl phosphate.

Figure 16:
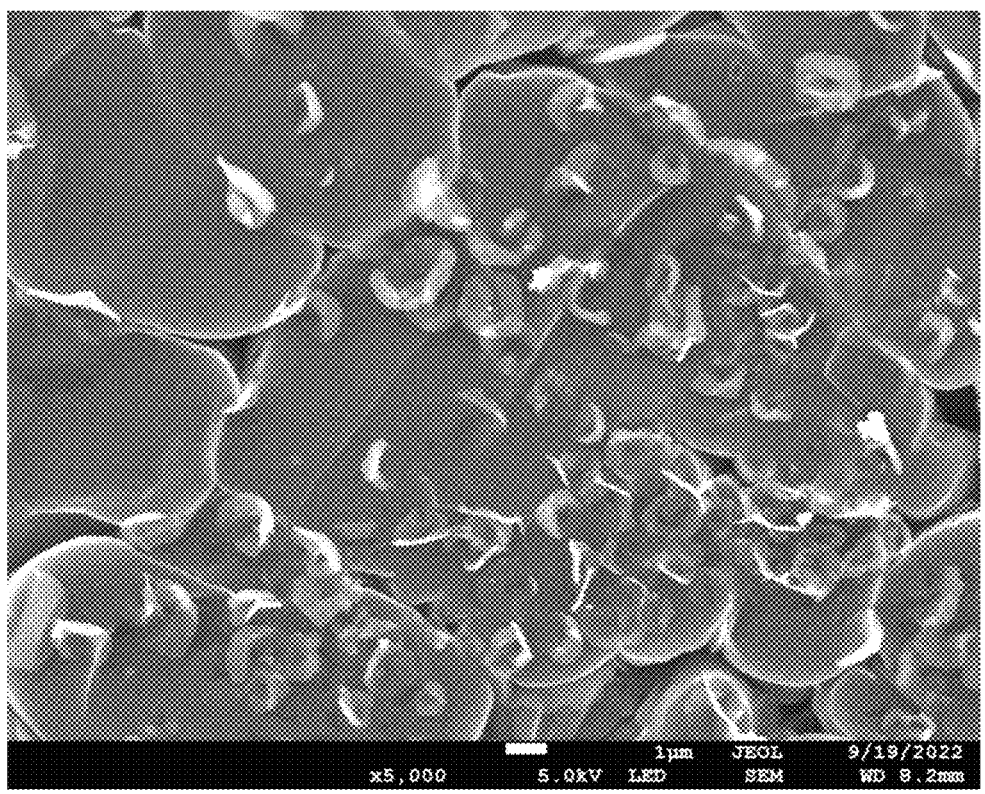
FIG. 16 is a SEM image of a lithium deposition morphology of a Li—Cu half cell with an electrolyte in Comparative Example 1.

FIG. 16 is a scanning electron microscope image of a lithium deposition morphology of the Li—Cu half cell assembled by applying the electrolyte, with a magnification factor of 5000 times. The figure shows that the lithium deposition morphology of the Li—Cu half cell assembled by applying the electrolyte shows a fish-scale lithium dendrite, showing incompatibility between the conventional phosphate and the lithium metal.

Figure 17:
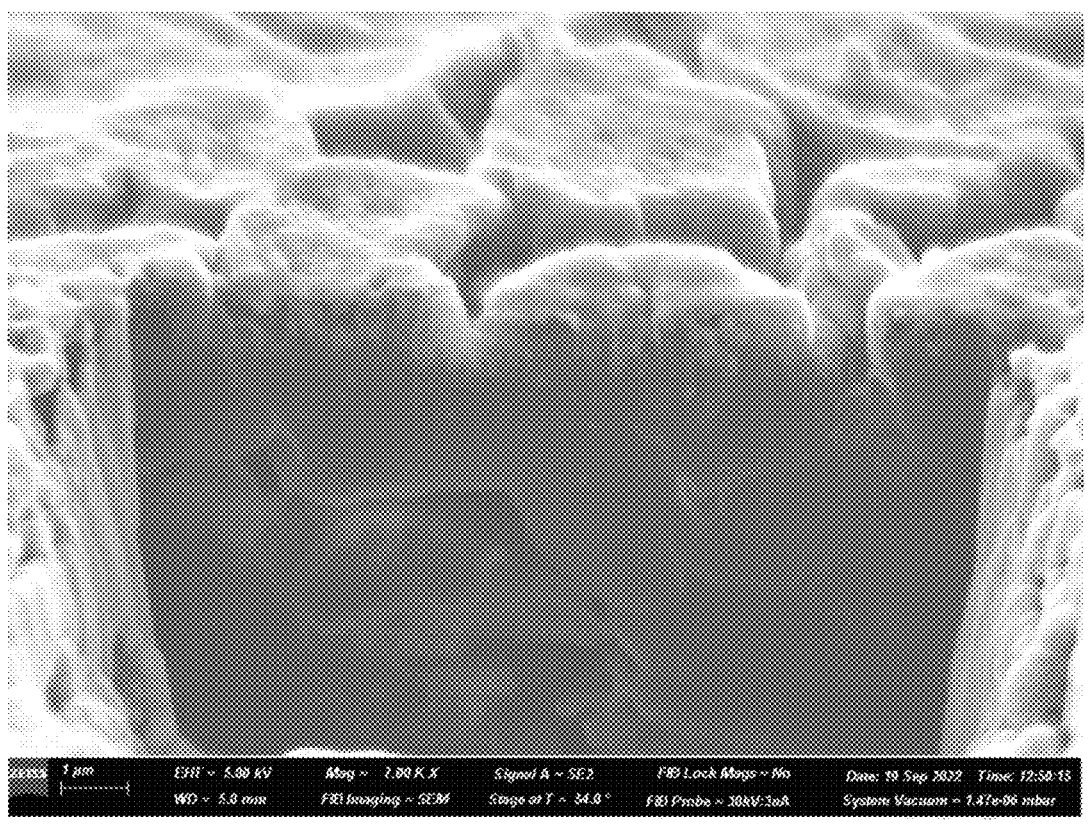
FIG. 17 is a FIB-SEM image of the lithium deposition morphology of the Li—Cu half cell with the electrolyte in Comparative Example 1.

FIG. 17 is a focusing ion beam-scanning electron microscope image of the lithium deposition morphology of the Li—Cu half cell applying the electrolyte. The figure shows that the lithium deposition morphology of the Li—Cu half cell applying the electrolyte is loose and porous, which increases asurface area of lithium deposition, thus aggravating subsequent side reactions between the electrolyte and the li-anode.

Comparative Example 2

(1) Ethylene carbonate and diethyl carbonate were mixed with volume ratio of 1:1.

(2) A certain mass of lithium hexafluorophosphate were added into the mixed solvent in the (1), so that a concentration reached 1 mol/L, and the mixture was subjected to magneton stirring for 3 hours to obtain a conventional carbonate electrolyte.

FIG. 5 shows self-extinguishing time of the conventional carbonate electrolyte obtained in the (2), which is 34.26 s/g, and is in sharp contrast with that of the phosphate-based flame-retardant electrolyte (0 s/g) in Embodiment 1, and the conventional carbonate electrolyte is easily ignited.

Figure 18:
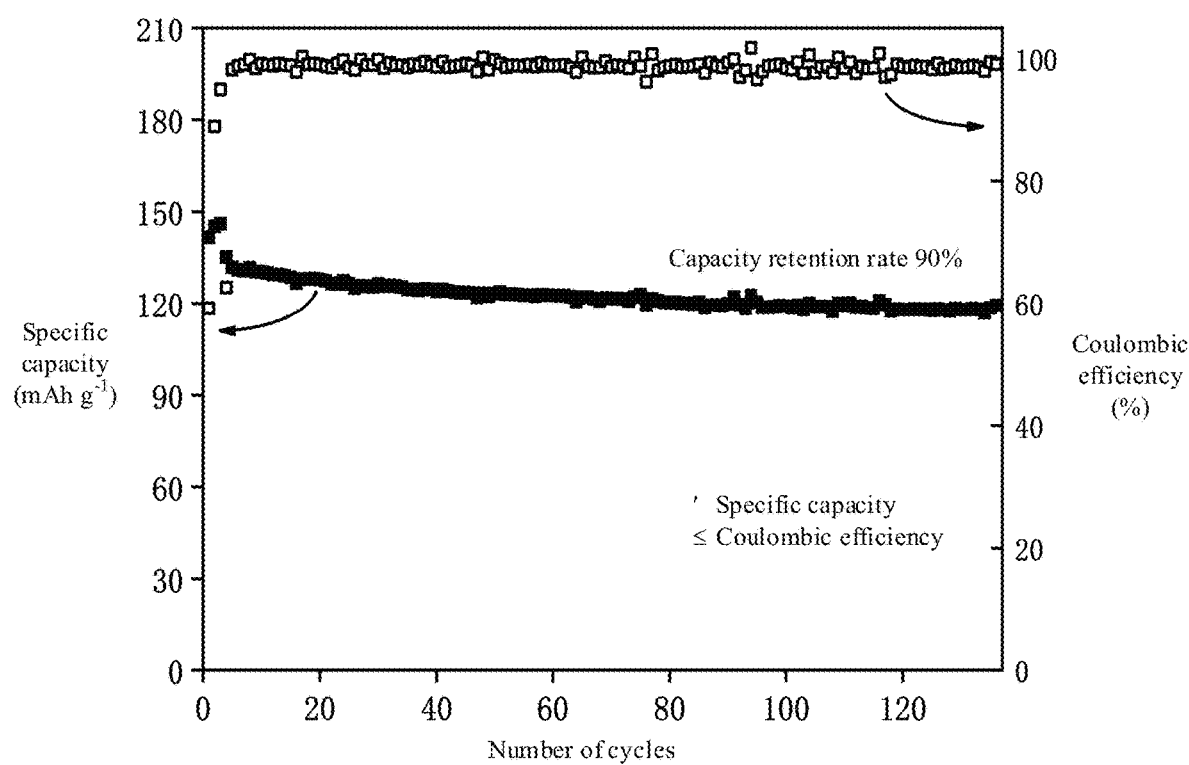
FIG. 18 is a cycle performance chart of a Li-NCM523 half cell with a conventional carbonate electrolyte in Comparative Example 2.

FIG. 18 is a cycle performance chart of a Li-NCM523 half cell of this comparative example, with a voltage range of 2.7 V to 4.2 V. The figure shows that coulombic efficiency reaches 99% after 140 cycles at a rate of 0.5 C, and a capacity retention rate is 90%. Compared with FIG. 6, the coulombic efficiency and the capacity retention rate are both lower than those in Embodiment 1.

The above are merely preferred embodiments and comparative examples of the present application, and are not intended to limit the present application. For those skilled in the art, the present application may have various modifications and changes. Any modification, equivalent replacement, or improvement made without departing from the spirit and principle of the present application should fall within the scope of protection of the present application.

We claim:

1. A phosphate-based flame-retardant electrolyte, consisting of a lithium salt, a phosphate solvent and a diluent, wherein,
   the lithium salt is a fluorine-containing lithium salt;
   the phosphate solvent is dimethyl (2-methoxyethoxy) methylphosphonate or diethyl (2-methoxyethoxy) methylphosphonate, and the phosphate solvent accounts for 10% to 90% of an overall electrolyte volume; and a volume ratio of the phosphate solvent to the diluent is 1 to 6:4 to 9; and
   a local salt concentration is 1 mol/L to 6.6 mol/L, and an overall salt concentration is 0.7 mol/L to 3 mol/L;
   wherein the lithium salt is one or more than two of lithium tetrafluoroborate, lithium bis(fluorosulfonyl)imide and lithium bis(trifluoromethanesulphonyl)imide; and
   wherein the diluent is one or more than two of 1H,1H, 5H-octafluoropentyl-1,1,2,2-tetrafluoroethyl ether, bis (2,2,2-trifluoroethyl) ether, methyl nonafluorobutyl ether and 1,1,2,2-tetrafluoroethyl-2,2,3,3-tetrafluoropropyl ether.

2. The phosphate-based flame-retardant electrolyte according to claim 1, wherein the local salt concentration is 5 mol/L to 6.6 mol/L, and the overall salt concentration is 0.8 mol/L to 1.2 mol/L.

3. The phosphate-based flame-retardant electrolyte according to claim 1, wherein a preparation method of the dimethyl (2-methoxyethoxy)methylphosphonate or the diethyl (2-methoxyethoxy)methylphosphonate comprises: mixing trimethyl phosphite or triethyl phosphite with methoxyethoxy methyl chloride according to a molar ratio of 2 to 1:1 to react at 110° C. to 150° C. for 6 hours to 13 hours, carrying out reduced pressure distillation on the above solution, and taking an ingredient distilled at 133° C. to 145° C. as the dimethyl (2-methoxyethoxy)methylphosphonate or diethyl (2-methoxyethoxy)methylphosphonate.

4. A lithium-metal battery, applying the phosphate-based flame-retardant electrolyte according to claim 1.

5. The lithium-metal battery according to claim 4, wherein an anode is lithium metal, and a cathode is at least one selected from the group consisting of lithium nickel cobalt manganese oxide, lithium iron phosphate, lithium cobalt oxide, organic lithium, and organic sulfur.

6. The lithium-metal battery according to claim 5, wherein the lithium-metal battery is a lithium-metal primary battery or a lithium-metal secondary battery.

* * * * *